(12) United States Patent
Miyairi et al.

(10) Patent No.: US 8,692,428 B2
(45) Date of Patent: Apr. 8, 2014

(54) LINEAR ACTUATOR

(75) Inventors: Shigenori Miyairi, Nagano (JP); Koji Nakatake, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 341 days.

(21) Appl. No.: 12/965,053

(22) Filed: Dec. 10, 2010

(65) Prior Publication Data

US 2011/0140557 A1 Jun. 16, 2011

(30) Foreign Application Priority Data

Dec. 11, 2009 (JP) ................................. 2009-281591

(51) Int. Cl.
*H02K 7/106* (2006.01)
*H02K 5/10* (2006.01)

(52) U.S. Cl.
USPC .................... 310/77; 310/80; 310/88; 310/89

(58) Field of Classification Search
USPC .............. 310/75 R, 77, 80, 88; 188/161–163
See application file for complete search history.

(56) References Cited

U.S. PATENT DOCUMENTS

2001/0017498 A1* 8/2001 Matsuoka et al. .............. 310/90

FOREIGN PATENT DOCUMENTS

| JP | 48-110877 U | 9/1973 | |
|---|---|---|---|
| JP | 49-118496 U | 9/1974 | |
| JP | 51-003364 U | 1/1976 | |
| JP | 51-28596 U | 3/1976 | |
| JP | 63-136939 | 6/1988 | |
| JP | 01-234105 | 9/1989 | |
| JP | 01-311844 | 12/1989 | |
| JP | 2003014017 A * | 1/2003 | .............. F16D 65/21 |
| JP | 2009-118732 | 5/2009 | |

OTHER PUBLICATIONS

Someya, JP2003014017A Machine Translation, Jan. 2003.*
Chinese Office Action dated Nov. 15, 2013 and English Summary translation, 5 pages.
Japanese Office action dated Nov. 19, 2013 and English Summary translation, 4 pages.
Brief Description of Cited References from JP Office Action (in English), 1 page.

* cited by examiner

*Primary Examiner* — Burton Mullins
*Assistant Examiner* — Eric Johnson
(74) *Attorney, Agent, or Firm* — Rankin, Hill & Clark LLP

(57) ABSTRACT

A linear actuator having an output shaft with a long moving distance is provided. A linear actuator includes a rotary shaft, a motor portion having a rotor and a stator, a ball screw mechanism including a ball screw nut fixed to a first end of the rotary shaft and a ball screw, a casing assembly including a first end bracket and a second end bracket, an electromagnetic brake device including a rotary brake disc, a stationary brake disc, and an electromagnetic coil, and a brake cover for covering the electromagnetic brake device. The electromagnetic brake device has a hollow structure allowing a second end of the rotary shaft to pass therethrough.

3 Claims, 9 Drawing Sheets

LINEAR ACTUATOR

TECHNICAL FIELD

The present invention relates to a linear actuator that converts a rotational motion into a linear motion.

BACKGROUND ART

A linear actuator disclosed in FIG. 1 of Japanese Patent Application Publication No. 2009-118732 (JP2009-118732β) includes a hollow rotary shaft 303 that is rotatable along with rotational motion of a motor, a ball screw nut 315 fixed to a first end 303A of the rotary shaft 303 in the longitudinal direction, and a ball screw 317 threadably engaged with the ball screw nut 315. As the ball screw nut 315 rotates along with rotational motion of the rotary shaft 303, the ball screw 317 makes linear motion in the axial direction of the rotary shaft 303. In the linear actuator, a second end 303B of the rotary shaft 303 in the axial direction is closed, and a disc 347 of an electromagnetic brake device 345 is provided at the second end 303B of the rotary shaft 303 (see FIG. 9).

In the linear actuator according mentioned above, however, the disc 347 of the electromagnetic brake device 345 is attached to the closed second end 303B of the rotary shaft 303, and therefore the ball screw 317 cannot move through the inside of the electromagnetic brake device 345. That is, the ball screw 317 can move no further than the second end 303B of the rotary shaft 303, at which the electromagnetic brake device 345 is provided. Therefore, in this linear actuator, the moving distance of the ball screw 317 serving as an output shaft is restricted (see FIG. 9).

SUMMARY OF THE INVENTION

An object of the present invention is to provide a linear actuator having a ball screw serving as an output shaft with a long moving distance.

Another object of the present invention is to provide a linear actuator in which intrusion of impurities such as oil into an electromagnetic brake device can be blocked even with an output shaft with a long moving distance.

A linear actuator according to the present invention includes a motor portion, a ball screw mechanism, a casing assembly, an electromagnetic brake device, and a brake cover. The motor portion includes a cylindrical rotary shaft having open first and second ends, a rotor fixed to the rotary shaft, and a stator disposed outside the rotor. A motor known in the art such as a stepping motor or a servo motor may be used as the motor portion.

The ball screw mechanism includes a ball screw nut and a ball screw. The ball screw nut is fixed to the first end of the rotary shaft. The ball screw is threadably engaged with the ball screw nut with part of the ball screw extending in the rotary shaft.

The casing assembly forms a casing for the motor portion and the ball screw mechanism, and includes a first end bracket configured to allow the ball screw to move in an axial direction of the rotary shaft and a second end bracket configured to allow the second end of the rotary shaft to rotatably project from the second end bracket. The first and second end brackets face each other in the axial direction.

The electromagnetic brake device includes a rotary brake disc, a stationary brake disc, an electromagnetic coil, and a stationary member. The stationary member is fixed to the second end bracket. The rotary brake disc is fixed to the rotary shaft and located adjacent to the second end of the rotary shaft. The stationary brake disc is configured to stop rotation of the rotary shaft b means of a frictional force when brought into contact with the rotary brake disc. The electromagnetic coil is configured to generate an electromagnetic force, when energized, which causes the rotary brake disc and the stationary brake disc to contact each other or separate from each other. The stationary brake disc and the electromagnetic coil form part of the stationary member.

The brake cover is fixed to the second end bracket to cover the electromagnetic brake device. In the present invention, the electromagnetic brake device has a hollow structure allowing the second end of the rotary shaft to pass therethrough. Since the electromagnetic brake device has such a hollow structure, the ball screw can move to the inside of the electromagnetic brake device. Therefore, according to the linear actuator of the present invention, the moving distance of an output shaft can be made longer.

In the configuration in which the rotary shaft can move inside the electromagnetic brake device, however, impurities such as oil and dust generated inside the rotary shaft, in which the ball screw moves, may intrude into the electromagnetic brake device from the second end of the rotary shaft to reduce a braking force of the electromagnetic brake device. Thus, an annular flange portion extending in radial directions of the rotary shaft may be provided at the second end of the rotary shaft passing through the electromagnetic brake device. Further, a cylindrical portion may be integrally provided on an inner wall portion of the brake cover to house the flange portion and to define a first labyrinth gap with an outer peripheral surface of the flange portion. Forming such a labyrinth structure between the inner wall portion of the brake cover and the flange portion at the second end of the rotary shaft can prevent oil, dust, or the like, generated inside the rotary shaft, from intruding into the electromagnetic brake device.

The labyrinth structure may be provided in any way. For example, a projecting portion may be integrally provided on the inner wall portion of the brake cover to be inserted into an opening portion of the rotary shaft that is open in the axial direction at the second end of the rotary shaft to define a second labyrinth gap with an inner wall surface of the rotary shaft. Providing such a projecting portion on the inner wall portion of the brake cover can reliably prevent oil or the like, generated inside the rotary shaft, from intruding into the electromagnetic brake device from the second end of the rotary shaft by virtue of a plurality of labyrinth structures.

In the linear actuator according to the present invention, the brake cover may be formed with a through hole through which the second end of the rotary shaft passes, and the ball screw may be long enough to project from the opening portion of the rotary shaft that is open in the axial direction at the second end of the rotary shaft passing through the brake cover. With the rotary shaft passing through the brake cover and the ball screw projecting from an opening portion of the rotary shaft at the second end of the rotary shaft, the ball screw can pass through the brake cover to further move to the outside of the second end of the rotary shaft passing through the brake cover. That is, the moving distance of the ball screw can be made longer than the length of the rotary shaft.

DESCRIPTION OF THE PREFERRED EMBODIMENTS

Figure 1:
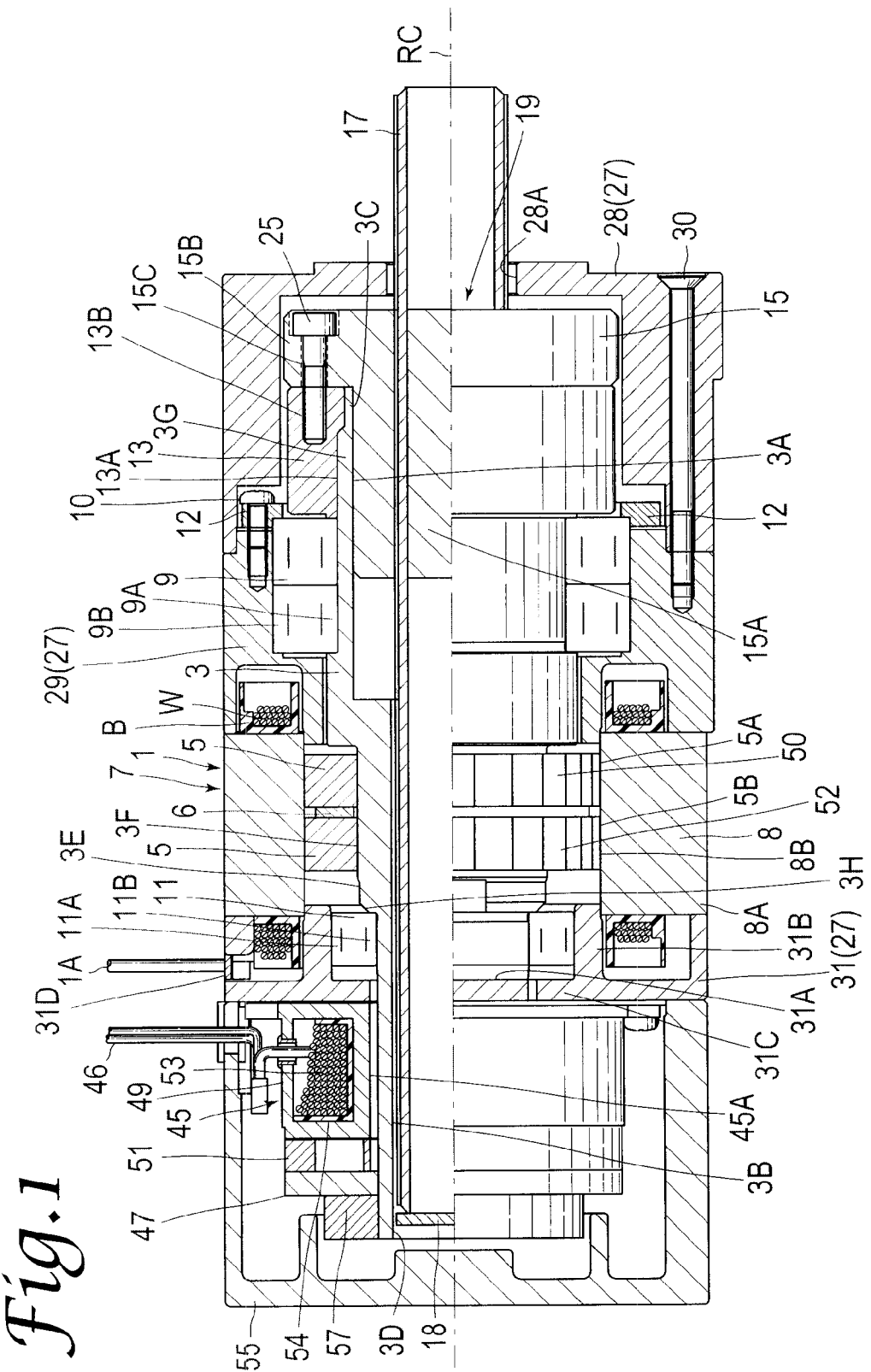
FIG. 1 is a cross-sectional view of a linear actuator according to a first embodiment of the present invention.

Linear actuators according to embodiments of the present invention will be described. FIG. 1 is a cross-sectional view of a linear actuator according to a first embodiment of the present invention. In FIG. 1, a rotary shaft, a rotor, a locknut, a ball screw nut, etc. are partially shown in cross section. In FIG. 1, reference numeral 1 denotes a motor portion formed by a stepping motor. The motor portion 1 includes a rotary shaft 3, a rotor 5, and a stator 7. The rotary shaft 3 has a cylindrical shape with both ends (a first end 3A and a second end 3B) opening to respectively form opening portions 3C and 3D. The rotary shaft 3 has the center of rotation RC, and has an inner diameter allowing a ball screw 17, which will be discussed later, to reciprocally move inside the rotary shaft 3 along the axis of the rotary shaft 3. A small diameter portion 3F and a large diameter portion 3G are provided on an outer peripheral portion 3E of the rotary shaft 3. The small diameter portion 3F is provided for fixation of the rotor 5. The large diameter portion 3G has a diameter larger than the diameter of the small diameter portion 3F, and is configured to receive a nut body 15A of a ball screw nut 15 which will be discussed later. The rotor 5 is fixed to the outer peripheral portion 3E of the rotary shaft 3. The stator 7 is disposed on the radially outside the rotor 5. In the embodiment, a hybrid stepping motor known in the art is used as the motor portion 1. The hybrid stepping motor includes two rotor stacks 5A and 5B respectively formed with a plurality of small teeth 50 and 52 disposed on their outer peripheries at a predetermined angular pitch, and a permanent magnet 6 disposed between the two rotor stacks 5A and 5B. The permanent magnet 6 is magnetized in the thickness direction such that magnetic poles with different polarities appear in the plurality of small teeth 50 and 52. A stator core 8 of the stator 7 has a plurality of magnetic pole portions 8B disposed on the inner periphery of a yoke 8A at equal intervals, and a bobbin B provided with a winding portion W is mounted on each of the magnetic pole portions 8B. A plurality of small teeth, not shown, are formed on magnetic pole surfaces of the plurality of magnetic pole portions 8B.

An inner race 9A of an annular thrust bearing 9 serving as a first bearing portion is fixed to the outer peripheral portion of the large diameter portion 3G at the first end 3A of the rotary shaft 3. An outer race 9B of the thrust bearing 9 is fitted in a first end bracket 29 forming part of a casing 27 which will be discussed later. A ring member 12 fixed to the first end bracket 29 using a screw 10 prevents the thrust bearing 9 from slipping off. The thrust bearing 9 rotatably supports the first end 3A of the rotary shaft 3 such that the rotary shaft 3 does not move in the axial direction or thrust direction.

A ball bearing 11 serving as a second bearing portion is provided on the outer peripheral portion 3E of the small portion 3F at the second end 3B of the rotary shaft 3. An outer race 11A of the ball bearing 11 is fitted in a second end bracket 31, and an inner race 11B of the ball bearing 11 is fitted on the second end 3B of the rotary shaft 3. A stepped portion 3H for bearing positioning is formed at the second end 3B of the rotary shaft 3.

A locknut 13 is threadably engaged on an extended portion of the first end 3A of the rotary shaft 3 projecting from the thrust bearing 9 in the axial direction. Specifically, a male thread portion, not shown, is formed on the outer peripheral portion of the large diameter portion 3G at the first end 3A of the rotary shaft 3. A female thread portion, not shown, is formed on an inner peripheral portion 13A of the locknut 13. The locknut 13 is threadably engaged with the rotary shaft 3 by threadably engaging the male thread portion of the rotary shaft 3 with the female thread portion of the locknut 13. With the locknut 13 threadably engaged with the rotary shaft 3, two screws, not shown, are fitted into through holes formed in the locknut 13 and screwed into screw holes, not shown, formed in the outer peripheral portion of the large diameter portion 3G of the rotary shaft 3 to fix the locknut 13 to the rotary shaft 3. The locknut 13 contacts the inner race 9A of the thrust bearing 9 or the first bearing portion to block movement of the inner race 9A of the thrust bearing 9 in the axial direction.

A ball screw nut 15 is fixed to the first end 3A of the rotary shaft 3. The ball screw nut 15 includes a nut body 15A fitted in the opening portion 3C of the rotary shaft 3, and a flange portion 15B integrally provided with the nut body 15A and located outside the opening portion 3C. With the flange portion 15B contacting the locknut 13, the ball screw nut 15 is screwed to the locknut 13 using four screws 25 or screw members disposed at intervals in the circumferential direction. The four screws 25 are fitted into through holes 15C formed in the flange portion 15B of the ball screw nut 15 at equal intervals and threadably engaged with screw holes 13B formed in the locknut 13 at equal intervals in correspondence with the through holes 15C to fix the ball screw nut 15 to the locknut 13. A stopper 18 is mounted to an end portion of the ball screw 17 located on the side of the second end 3B of the rotary shaft 3 in order to prevent the ball screw 17 from coming off from the ball screw nut 15 when the ball screw 17 reciprocally moves inside the rotary shaft 3. The stopper 18 has an outer diameter which is larger than the diameter of screw holes of the ball screw nut 15 to be threadably engaged with the ball screw 17 and is smaller than the inner diameter of the rotary shaft 3. The ball screw 17 is threadably engaged with the ball screw nut 15 with part of the ball screw 17 extending in the rotary shaft 3. The ball screw nut 15 and the ball screw 17 form a ball screw mechanism 19. An end cover 28 for covering the locknut 13, the ball screw nut 15, and part of the ball screw 17 are fixed to the first end bracket 29. The end cover 28 is located on the first end 3A side of the rotary shaft 3 in the axial direction of the rotary shaft 3 to surround the ball screw mechanism 19, and formed with a through hole 28A allowing movement of the ball screw 17 in the axial direction. The end cover 28 is fixed at four corners of the first end bracket 29 using four screws 30. In the linear actuator according to the embodiment, the motor portion 1 and the ball screw mechanism 19 are housed in a casing assembly or casing 27. The casing assembly includes the end cover 28, the first end bracket 29, the second end bracket 31, the ring member 12, and the stator core 8 of the stator 7.

The ball bearing 11 forming the second bearing portion is fitted in the second end bracket 31. Specifically, the ball bearing 11 is fitted in a cylindrical portion 31B integrally formed with an inner wall portion 31A of the second end bracket 31. A through hole, not shown, is formed in a side wall portion 31D of the second end bracket 31. The through hole allows a lead wire 1A, which is connected to the motor portion 1 to supply electricity to the motor portion 1A, to be led out to the outside.

An electromagnetic brake device 45 is fixed to the second end bracket 31. The electromagnetic brake device 45 includes a rotary brake disc 47, a stationary brake disc 51, an electromagnetic coil 53, and a stationary member 49. The rotary brake disc 47 is fixed to the rotary shaft 3, and located adjacent to the second end 3B of the rotary shaft 3. The stationary member 49 is fixed to the outer wall portion 31C of the second end bracket 31. The stationary member 49 include the stationary brake disc 51 and the electromagnetic coil 53 as its main components. The electromagnetic coil 53 is wound around an annular bobbin 54 made of an insulating resin. The stationary brake disc 51 is moved in the axial direction along the rotary shaft 3 by an electromagnetic force generated by the electromagnetic coil 53 to be brought into contact with the rotary brake disc 47. A return spring mechanism, not shown, is disposed between the stationary brake disc 51 and the bobbin 54 to return the stationary brake disc 51 to the original position when excitation of the electromagnetic coil 53 is canceled. The stationary brake disc 51 is configured to stop rotation of the rotary shaft 3 through a frictional force when brought into contact with the rotary brake disc 47. The electromagnetic coil 53 is configured to generate an electromagnetic force, when energized, which causes the rotary brake disc 47 and the stationary brake disc 51 to contact each other or separate from each other. In the embodiment, the electromagnetic brake device 45 is brought to a braking state to prevent the rotary shaft 3 from being rotated by an external force when not supplied with electricity. Thus, the return spring mechanism discussed above is configured to generate a force for pressing the stationary brake disc 51 against the rotary brake disc 49 when the electromagnetic coil 53 is not excited. That is, in order to prevent the rotary shaft 3 from being rotated by an external force when not supplied with electricity, the electromagnetic brake device 45 is configured to bring the stationary brake disc 51 and the rotary brake disc 47 into contact with each other when electricity is not supplied, that is, no electromagnetic force is generated. If the electromagnetic brake device 45 is used for the purpose of braking the rotating rotary shaft 3 to a stop, the return spring mechanism may be configured to generate a force in the direction of separating the stationary brake disc 51 from the rotary brake disc 47 when the electromagnetic coil 53 is not excited. In the embodiment, a gap is formed between the inner peripheral surfaces of the bobbin 54 and the stationary brake disc 51 and the outer peripheral surface of the rotary shaft 3 to allow movement of the rotary shaft 3 in the axial direction. A brake cover 55 is fixed to the outer wall portion 31C of the second end bracket 31 to further cover the electromagnetic brake device 45.

In the configuration discussed above, the electromagnetic brake device 45 has a hollow structure in which a through hole 45A is formed inside the electromagnetic brake device 45 to allow the second end 3B of the rotary shaft 3 to pass therethrough. The movable range of the ball screw 17 can be increased by providing the electromagnetic brake device 45 with a hollow structure and making the rotary shaft 3 long enough for the second end 3B of the rotary shaft 3 to pass through the inside of the through hole 45A. That is, the moving distance of the ball screw 17 serving as an output shaft can be made longer than that according to the related art.

Figure 2:
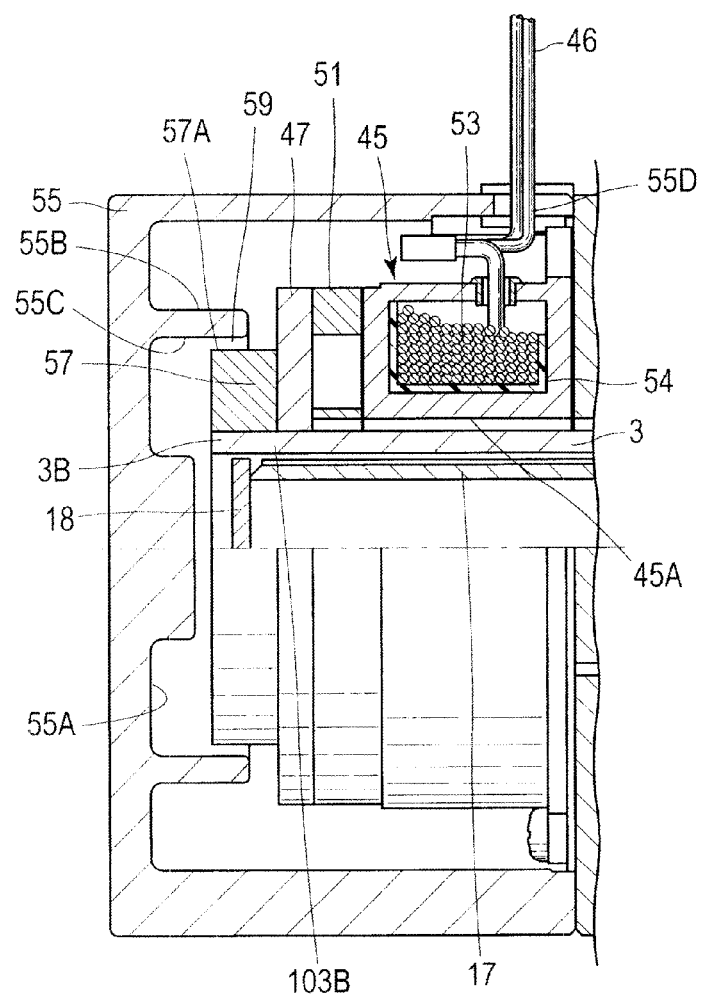
FIG. 2 is an enlarged view showing part of the linear actuator according to the first embodiment of FIG. 1 (showing a portion including an electromagnetic brake device and a brake cover).

FIG. 2 is an enlarged view showing part of the linear actuator according to the first embodiment shown in FIG. 1, showing a portion including the electromagnetic brake device 45 and the brake cover 55. In the embodiment, as shown in FIG. 2, an annular flange portion 57 extending in radial directions of the rotary shaft 3 is fixed at the second end 3B of the rotary shaft 3 passing through the through hole 45A of the electromagnetic brake device 45, and located adjacent to the rotary brake disc 47.

Figure 3:
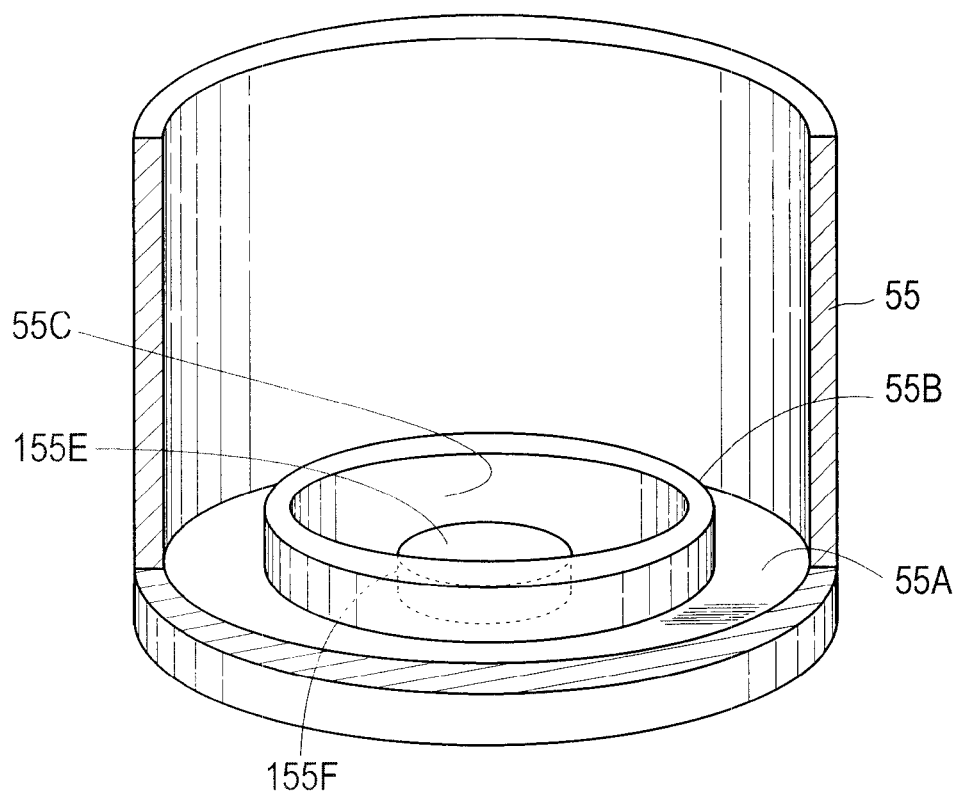
FIG. 3 is a perspective view in which the inside of the brake cover of FIG. 2 is partially cut away.

As shown in FIG. 3, a cylindrical portion 55B is integrally formed on an inner wall portion 55A of the brake cover 55. The cylindrical portion 55B houses the flange portion 57, and forms a gap 59 or a first gap with an outer peripheral surface 57A of the flange portion 57. The gap 59 forms a labyrinth structure between an inner peripheral surface 55C (see FIG. 3) of the cylindrical portion 55B and the outer peripheral surface 57A of the flange portion 57. A through hole 55D is formed in a portion of the inner wall portion 55A of the brake cover 55 that is adjacent to the second end bracket 31. The through hole 55D allows a lead wire 46, which is connected to the electromagnetic brake device 45 to supply electricity to the electromagnetic brake device 45, to be led out to the outside.

In the first embodiment of the present invention, the gap 59 is formed between the brake cover 55 and the second end 3B of the rotary shaft 3 to form a labyrinth structure. Therefore, it is possible to prevent oil, dust, or the like, adhering to the ball screw 17 or the like located inside the rotary shaft 3, from intruding into the electromagnetic brake device 45. As a result, the risk of intrusion of oil or the like, which may reduce the braking force of the electromagnetic brake device 45, can be mitigated even if the rotary shaft 3 can move inside the electromagnetic brake device 45 as in the embodiment.

Figure 4:
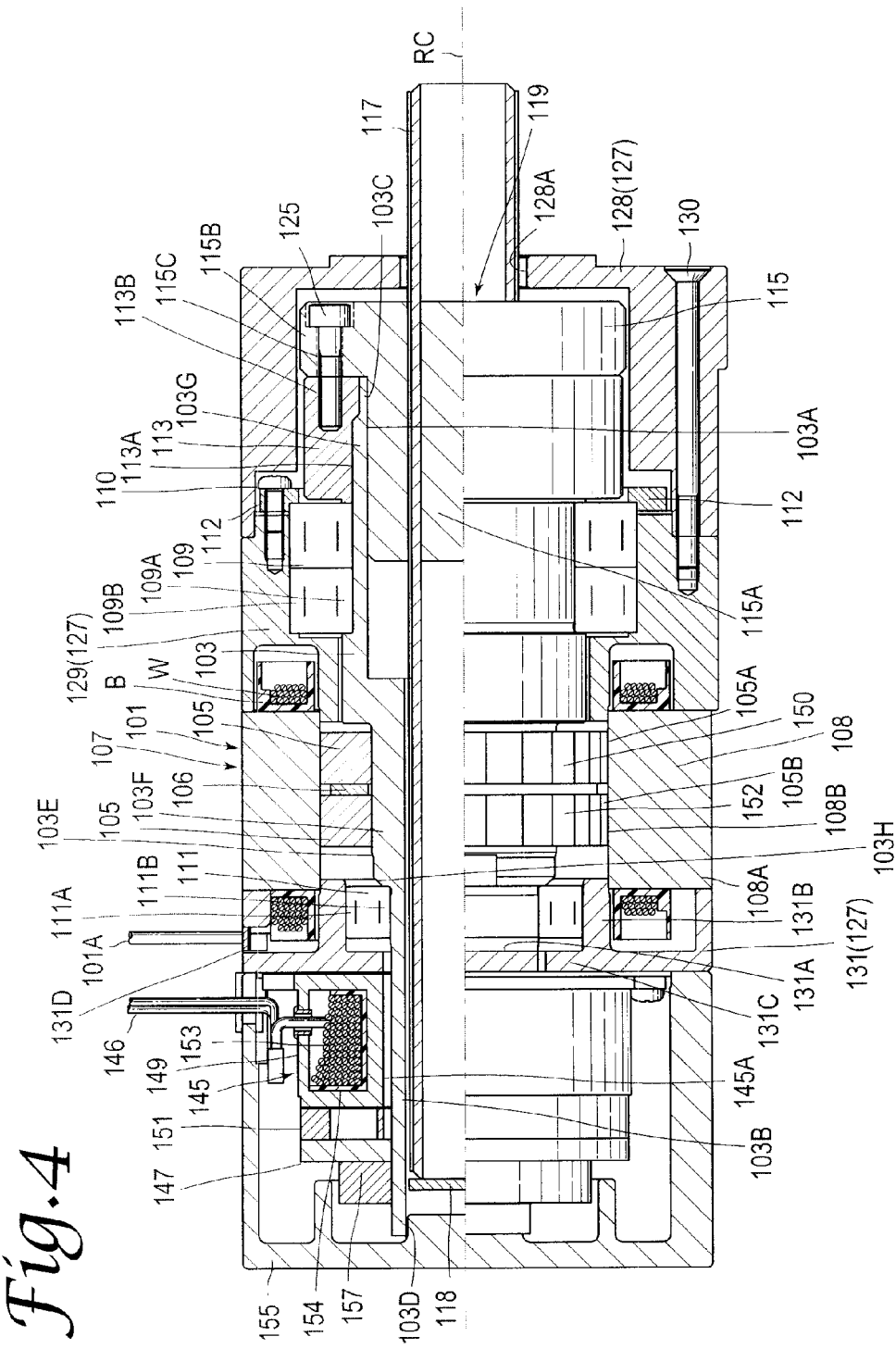
FIG. 4 is a cross-sectional view of a linear actuator according to a second embodiment of the present invention.
Figure 5:
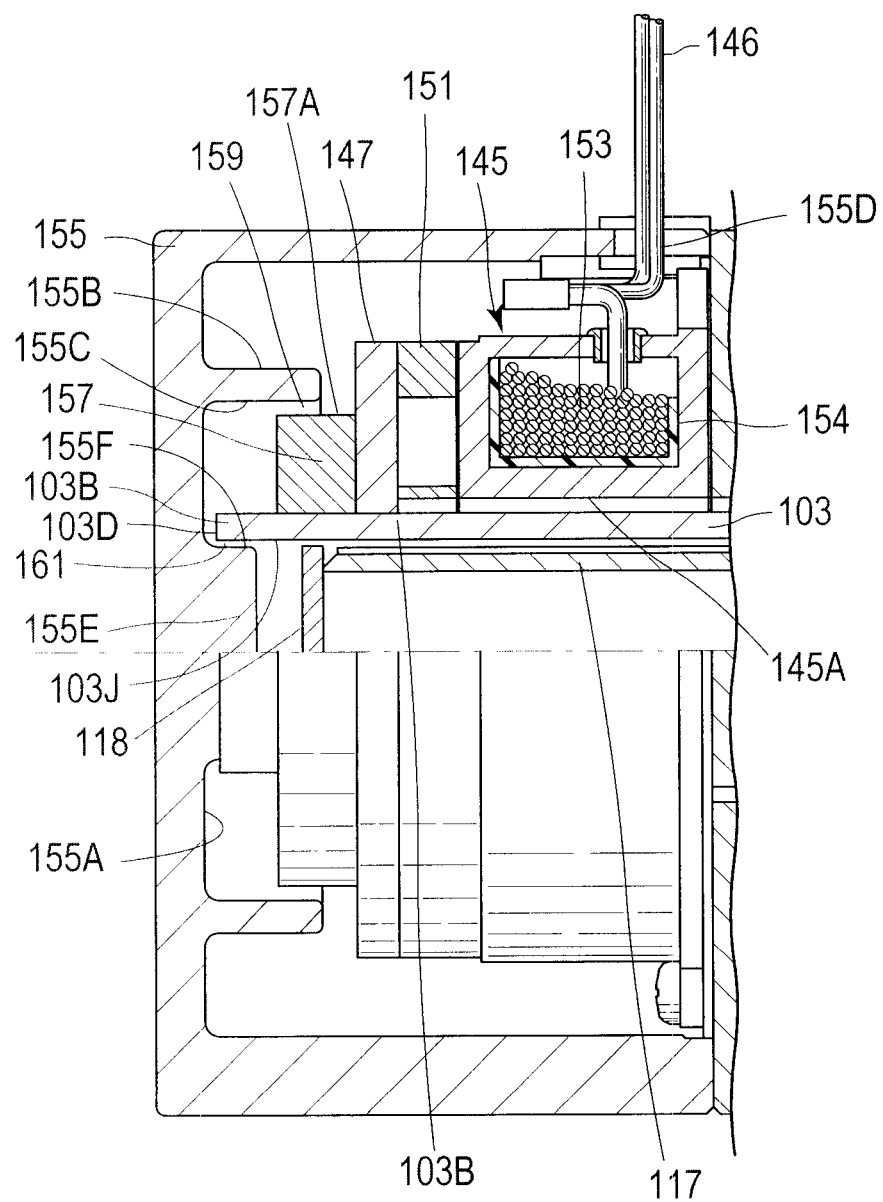
FIG. 5 is an enlarged view showing part of the linear actuator according to the second embodiment of FIG. 4 (showing a portion including an electromagnetic brake device and a brake cover).

Next, a linear actuator according to a second embodiment of the present invention will be described. FIG. 4 is a cross-sectional view of the linear actuator according to the second embodiment of the present invention. FIG. 5 is an enlarged view showing part of the linear actuator according to the second embodiment shown in FIG. 4, showing a portion including an electromagnetic brake device 145 and a brake cover 155. As in FIGS. 1 and 2, rotary members such as a rotary shaft 103 are partially shown in cross section. In the second embodiment shown in FIGS. 4 and 5, components similar to those of the first embodiment shown in FIGS. 1 and 2 are denoted by reference numerals obtained by adding 100 to the reference numerals affixed to their counterparts in FIGS. 1 and 2 and their descriptions are omitted.

In the linear actuator according to the second embodiment, a columnar projecting portion 155E is integrally formed on an inner wall portion 155A of the brake cover 155 (see FIGS. 3 to 5). The projecting portion 155E is inserted into an opening portion 103D that is open in the axial direction at a second end 103B of a rotary shaft 103 to form a gap 161 or a second gap with an inner peripheral surface 103J of the rotary shaft 103. The gap 161 forms a labyrinth structure between an outer peripheral surface 155F (see FIGS. 3 to 5) of the projecting portion 155E and the inner peripheral surface 103J of the rotary shaft 103. In the embodiment, the gap 161 is provided in addition to a gap 159 to form a plurality of labyrinth structures. Therefore, it is possible to reliably prevent impurities such as oil, generated inside the rotary shaft 103, from intruding into the electromagnetic brake device 145 from the second end 103B of the rotary shaft 103.

Figure 6:
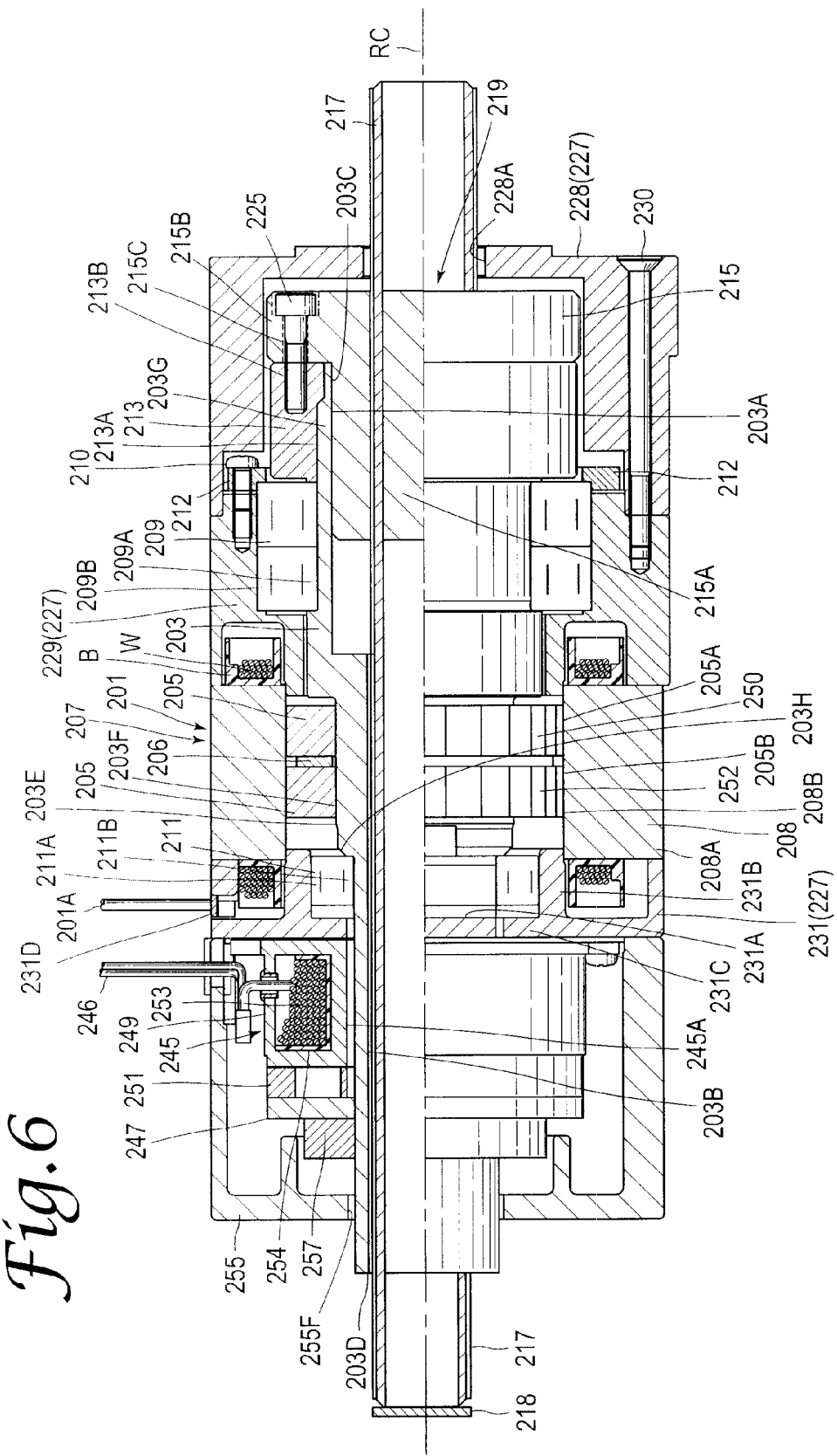
FIG. 6 is a cross-sectional view of a linear actuator according to a third embodiment of the present invention.
Figure 7:
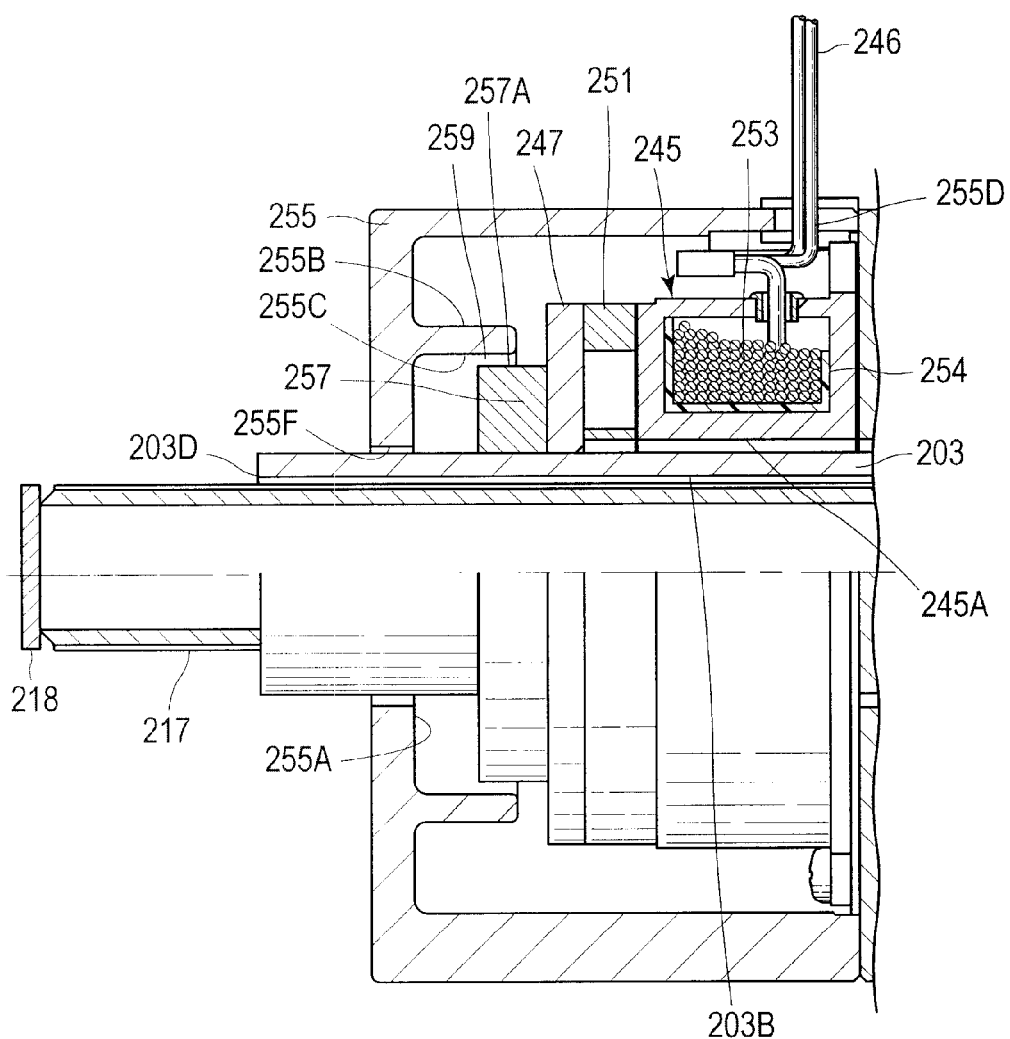
FIG. 7 is an enlarged view showing part of the linear actuator according to the third embodiment of FIG. 6 (showing a portion including an electromagnetic brake device and a brake cover).
Figure 8:
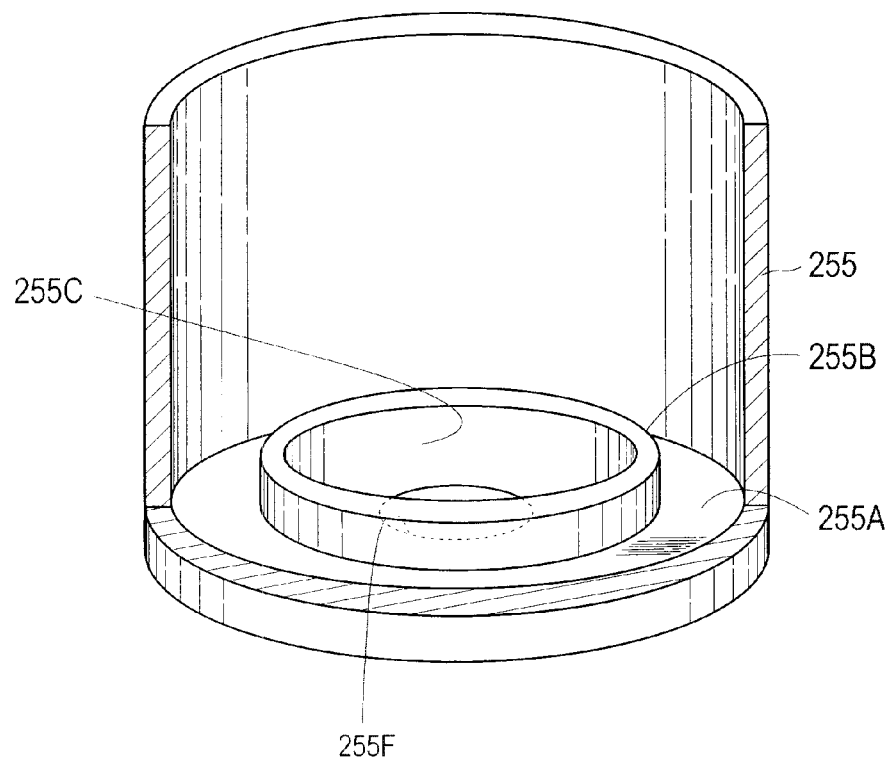
FIG. 8 is a perspective view in which the inside of the brake cover of FIG. 7 is partially cut away.
Figure 9:
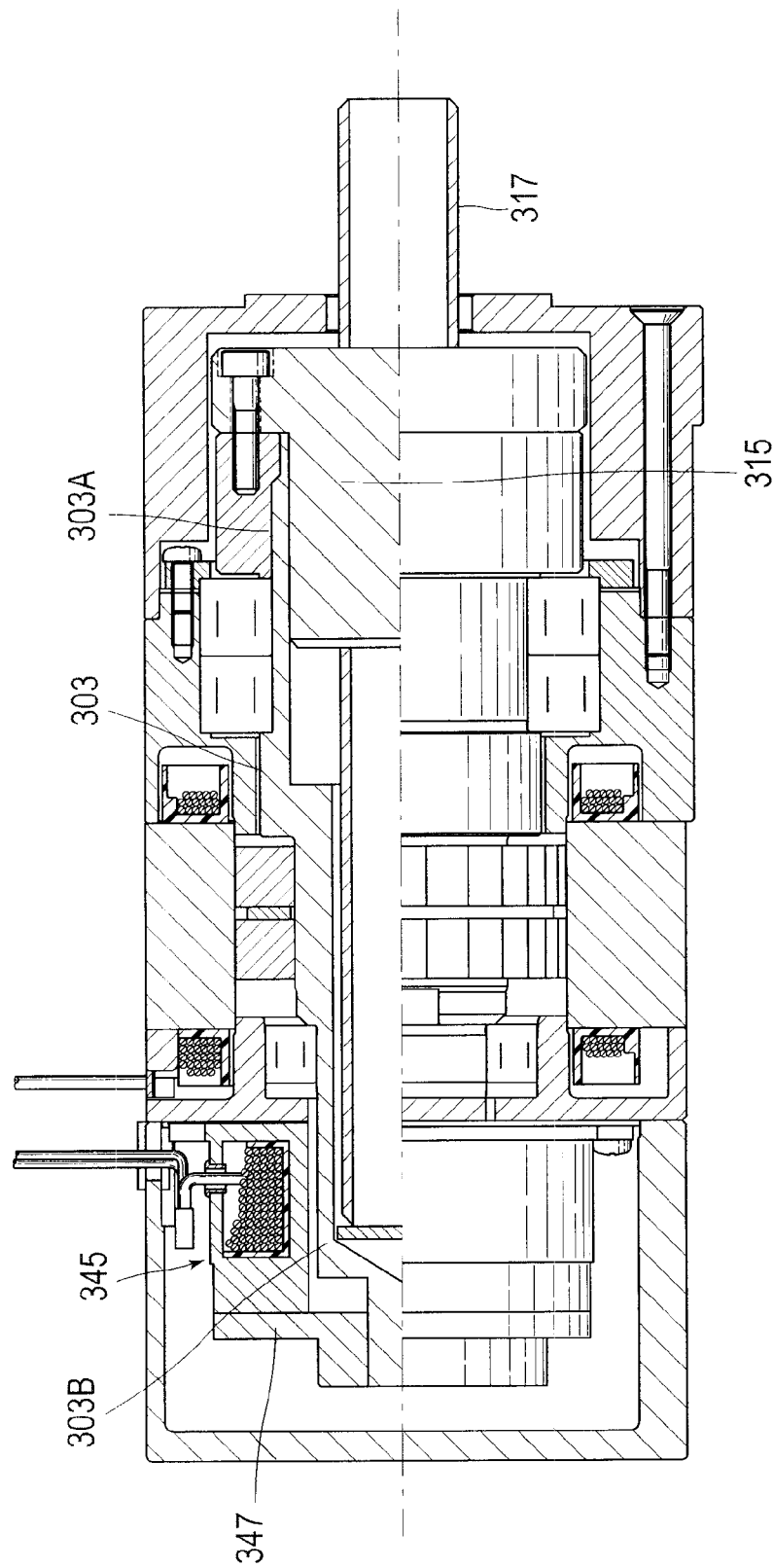
FIG. 9 shows the structure of a linear actuator according to the related art.

Next, a linear actuator according to a third embodiment of the present invention will be described. FIG. 6 is a cross-sectional view of the linear actuator according to the third embodiment of the present invention. FIG. 7 is an enlarged view showing part of the linear actuator according to the third embodiment shown in FIG. 6, showing a portion including an electromagnetic brake device 245 and a brake cover 255. As in FIGS. 1 and 2, rotary members such as a rotary shaft 203 are partially shown in cross section. In the third embodiment shown in FIGS. 6 and 7, components similar to those of the first embodiment shown in FIGS. 1 and 2 are denoted by reference numerals obtained by adding 200 to the reference numerals affixed to their counterparts in FIGS. 1 and 2 and their descriptions are omitted. In the embodiment, a through hole 255F is formed in the brake cover 255 to allow a second end 203B of a rotary shaft 203 to pass therethrough (see FIGS. 7 and 8). The diameter of the through hole 255F is larger than the outer diameter of the second end 203B of the rotary shaft 203 to allow the second end 203B of the rotary shaft 203 to rotate in the through hole 255F. A ball screw 217 is long enough to project from an opening portion 203D of the rotary shaft 203 that is open in the axial direction at the second end 203B of the rotary shaft 203 passing through the brake cover 255. With the rotary shaft 203 passing through the brake cover 255 and the ball screw 217 projecting from the opening portion 203D of the rotary shaft 203 at the second end 203B of the rotary shaft 203, the ball screw 217 can pass through the brake cover 255 to further move to the outside of the second end 203B of the rotary shaft 203 passing through the brake cover 255. That is, the moving distance of the ball screw 217 can be made larger than the length of the rotary shaft 203, which provides an output shaft with a significantly long moving distance compared to the linear actuator according to the related art.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. A linear actuator comprising:
    a motor portion including a cylindrical rotary shaft having open first and second ends, a rotor fixed to the rotary shaft, and a stator disposed outside the rotor;
    a ball screw mechanism including a ball screw nut fixed to the first end of the rotary shaft, and a ball screw which is threadably engaged with the ball screw nut and part of which extends in the rotary shaft;
    a casing assembly for forming a casing for the motor portion and the ball screw mechanism, the casing assembly including a first end bracket configured to allow the ball screw to move in an axial direction of the rotary shaft and a second end bracket configured to allow the second end of the rotary shaft to rotatably project from the second end bracket, the first and second end brackets facing each other in the axial direction;
    an electromagnetic brake device including a rotary brake disc fixed to the rotary shaft and located adjacent to the second end of the rotary shaft, a stationary brake disc for stopping rotation of the rotary shaft when brought into contact with the rotary brake disc, an electromagnetic coil capable of generating an electromagnetic force, when energized, which causes the rotary brake disc and the stationary brake disc to contact each other or separate from each other, and a stationary member fixed to the second end bracket, the electromagnetic brake device having a hollow structure allowing the second end of the rotary shaft to pass therethrough; and
    a brake cover fixed to the second end bracket to close the casing assembly, and to cover the electromagnetic brake device, wherein:
    an annular flange portion extending in radial directions of the rotary shaft and provided at the second end of the rotary shaft passing through the electromagnetic brake device, and located adjacent to the rotary brake disc; and
    a cylindrical portion integrally provided on an inner wall portion of the brake cover and extending toward the brake device to surround the flange portion and to define a first labyrinth gap with an outer peripheral surface of the flange portion to prevent impurities including oil and dust generated inside the rotary shaft from intruding into the electromagnetic brake device.

2. The linear actuator according to claim 1, further comprising:
    a projecting portion integrally provided on the inner wall portion of the brake cover to be inserted into an opening portion of the rotary shaft that is open in the axial direction at the second end of the rotary shaft to define a second labyrinth gap with an inner wall surface of the rotary shaft to prevent impurities including oil and dust generated inside the rotary shaft from intruding into the electromagnetic brake device from the second end of the rotary shaft.

3. The linear actuator according to claim 1, wherein
    the brake cover is formed with a through hole through which the second end of the rotary shaft passes, and
    the ball screw is long enough to project from an opening portion of the rotary shaft that is open in the axial direction at the second end of the rotary shaft passing through the brake cover.

* * * * *